US012651070B2

(12) United States Patent (10) Patent No.: US 12,651,070 B2
Nagai et al. (45) Date of Patent: Jun. 9, 2026

(54) VERIFICATION SYSTEM, VERIFICATION METHOD, AND RECORDING MEDIUM

(71) Applicant: Panasonic Automotive Systems Co., Ltd., Kanagawa (JP)

(72) Inventors: Takumaru Nagai, Osaka (JP); Yoshiharu Imamoto, Kanagawa (JP); Kaoru Yokota, Hyogo (JP); Yuishi Torisaki, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 31 days.

(21) Appl. No.: 19/022,584

(22) Filed: Jan. 15, 2025

(65) Prior Publication Data

US 2025/0156549 A1 May 15, 2025

Related U.S. Application Data

(63) Continuation of application No. PCT/JP2023/019047, filed on May 23, 2023.

(30) Foreign Application Priority Data

Sep. 28, 2022 (JP) ................................. 2022-155590

(51) Int. Cl.
    G06F 21/57     (2013.01)
    G06F 8/65      (2018.01)
(52) U.S. Cl.
    CPC .............. *G06F 21/572* (2013.01); *G06F 8/65* (2013.01); *G06F 2221/031* (2013.01)
(58) Field of Classification Search
    CPC ....... G06F 21/572; G06F 8/65; G06F 221/031
    See application file for complete search history.

(56) References Cited

U.S. PATENT DOCUMENTS 9,705,678 B1    7/2017   Wang
9,792,440 B1   10/2017   Wang
               (Continued)

FOREIGN PATENT DOCUMENTS

JP    2019-174426 A    10/2019
JP    2020-187650 A    11/2020
JP    2021-512543 A     5/2021

OTHER PUBLICATIONS

Office Action issued in German Patent Application No. 11 2023 004 045.1, dated Jan. 9, 2026, along with an English translation thereof.

(Continued)

*Primary Examiner* — Benjamin A Kaplan
(74) *Attorney, Agent, or Firm* — Greenblum & Bernstein, P.L.C.

(57) ABSTRACT

A verification system includes: a first verification device that verifies integrity of a first verification target; and a second verification device that has a higher security privilege than the first verification device and verifies integrity of the first verification device. The first verification device includes: a first verifier that refers to first verification related information including first verification target information and a first expected value, generates a first verification value by performing the predetermined operation on data on a first storage area storing the first program, and verifies integrity by comparing the first verification value with the first expected value; and a first updater that accepts a first update request for updating the first verification related information when receiving the first update request from the second verification device or when receiving the first update request while the first verification related information is updated, and updates the first verification related information.

9 Claims, 13 Drawing Sheets

(56) References Cited

U.S. PATENT DOCUMENTS

| | | | | |
|---|---|---|---|---|
| 11,178,158 | B2 * | 11/2021 | Buffard | ................. H04L 9/3247 |
| 2016/0267273 | A1 * | 9/2016 | Sugawara | ............. G06F 21/572 |
| 2019/0238555 | A1 | 8/2019 | Buffard et al. | |
| 2021/0389953 | A1 | 12/2021 | Sharma et al. | |

OTHER PUBLICATIONS

International Search Report issued in WIPO Patent Application No. PCT/JP2023/019047, dated Aug. 1, 2023, along with an English translation thereof.
Written Opinion of the International Searching Authority (WO/ISA) issued in WIPO Patent Application No. PCT/JP2023/019047, dated Aug. 1, 2023, along with an English translation thereof.

\* cited by examiner

FIG. 11

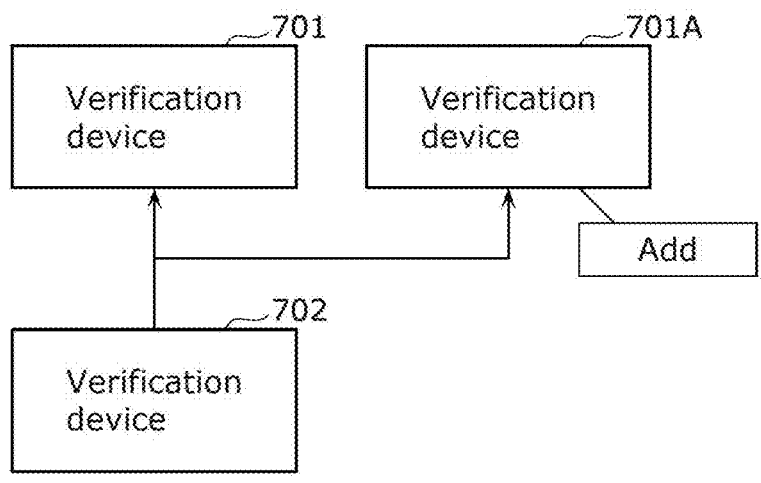

FIG. 12

| Verifying device | Verification target | Storage area | Expected value |
|---|---|---|---|
| Verification device 702 | Verification device 701 | Storage area A | Expected value A |

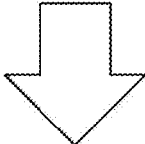

| Verifying device | Verification target | Storage area | Expected value |
|---|---|---|---|
| Verification device 702 | Verification device 701 | Storage area A | Expected value A |
| Verification device 702 | Verification device 701A | Storage area B | Expected value B |

FIG. 13

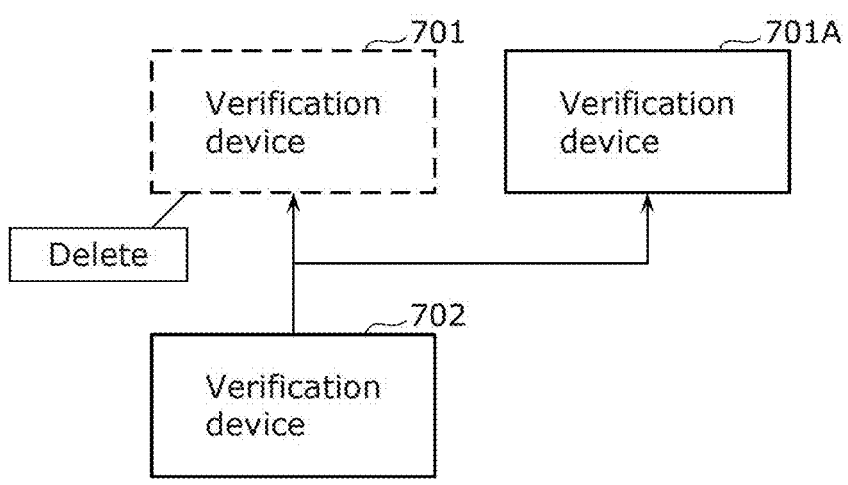

FIG. 14

| Verifying device | Verification target | Storage area | Expected value |
|---|---|---|---|
| Verification device 702 | Verification device 701 | Storage area A | Expected value A |
| Verification device 702 | Verification device 701A | Storage area B | Expected value B |

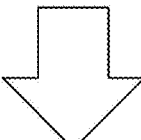

| Verifying device | Verification target | Storage area | Expected value |
|---|---|---|---|
| Verification device 702 | Verification device 701A | Storage area B | Expected value B |

| Verifying device | Verification target | Storage area | Expected value |
|---|---|---|---|
| Verification device 702 | Verification device 701 | Storage area A | Expected value A |

| Verifying device | Verification target | Storage area | Expected value |
|---|---|---|---|
| Verification device 702 | Verification device 701B | Storage area C | Expected value C |

VERIFICATION SYSTEM, VERIFICATION METHOD, AND RECORDING MEDIUM

CROSS REFERENCE TO RELATED APPLICATION

This is a continuation application of PCT International Application No. PCT/JP2023/019047 filed on May 23, 2023, designating the United States of America, which is based on and claims priority of Japanese Patent Application No. 2022-155590 filed on Sep. 28, 2022.

FIELD

The present disclosure relates to a verification system, a verification method, and a recording medium.

BACKGROUND

Patent Literature (PTL) 1 discloses a multi-controller system in which a chain of trust across a plurality of controllers that starts from a root of trust (ROT) provided in a main controller is constructed. For example, whether a program executed in each controller is valid is determined.

CITATION LIST

Patent Literature

PTL 1: Japanese Unexamined Patent Application Publication No. 2020-187650

SUMMARY

Technical Problem

However, the system according to PTL 1 can be improved upon.

In view of this, the present disclosure provides a verification system or the like capable of improving upon the above related art.

Solution to Problem

A verification system according to one aspect of the present disclosure includes: a first verification device that verifies integrity of a first verification target; and a second verification device that has a higher security privilege than the first verification device and verifies integrity of the first verification device. The first verification device includes a first memory and a first processor coupled to the first memory. The first processor, by using the first memory, operates as: a first verifier that refers to first verification related information including first verification target information and a first expected value, the first verification target information indicating the first verification target, the first expected value being generated by performing a predetermined operation on first data on a first program implementing the first verification target, generates a first verification value by performing the predetermined operation on data on a first storage area storing the first program implementing the first verification target indicated by the first verification target information, and verifies the integrity of the first verification target by comparing the first verification value with the first expected value; and a first updater that accepts, when the first program is updated, a first update request for updating the first verification related information when receiving the first update request from the second verification device or when receiving the first update request while the first verification related information is updated, and that updates the first verification related information based on the accepted first update request.

Moreover, a verification method according to one aspect of the present disclosure is a verification method by a verification system that includes a first verification device and a second verification device. The first verification device verifies integrity of a first verification target. The second verification device has a higher security privilege than the first verification device and verifies integrity of the first verification device. The first verification device: refers to first verification related information including first verification target information and a first expected value, the first verification target information indicating the first verification target, the first expected value being generated by performing a predetermined operation on first data on a first program implementing the first verification target, generates a first verification value by performing the predetermined operation on data on a first storage area storing the first program implementing the first verification target indicated by the first verification target information, and verifies the integrity of the first verification target by comparing the first verification value with the first expected value; and accepts, when the first program is updated, a first update request for updating the first verification related information when receiving the first update request from the second verification device or when receiving the first update request while the first verification related information is updated, and updates the first verification related information based on the accepted first update request.

It is to be noted that these general and specific aspects may be implemented using a system, a method, an integrated circuit, a computer program, or a computer readable recording medium such as a CD-ROM, or any combination of systems, methods, integrated circuits, computer programs, or recording media.

Advantageous Effects of Invention

A verification system or the like according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 11 is a diagram illustrating an example of a configuration of the verification system in a case where a verification target is added.

FIG. 12 is a diagram for describing update processing of verification related information in the case where the verification target is added.

FIG. 13 is a diagram illustrating an example of a configuration of the verification system in a case where a verification target is deleted.

FIG. 14 is a diagram for describing update processing of verification related information in the case where the verification target is deleted.

DESCRIPTION OF EMBODIMENT

Figure 1:
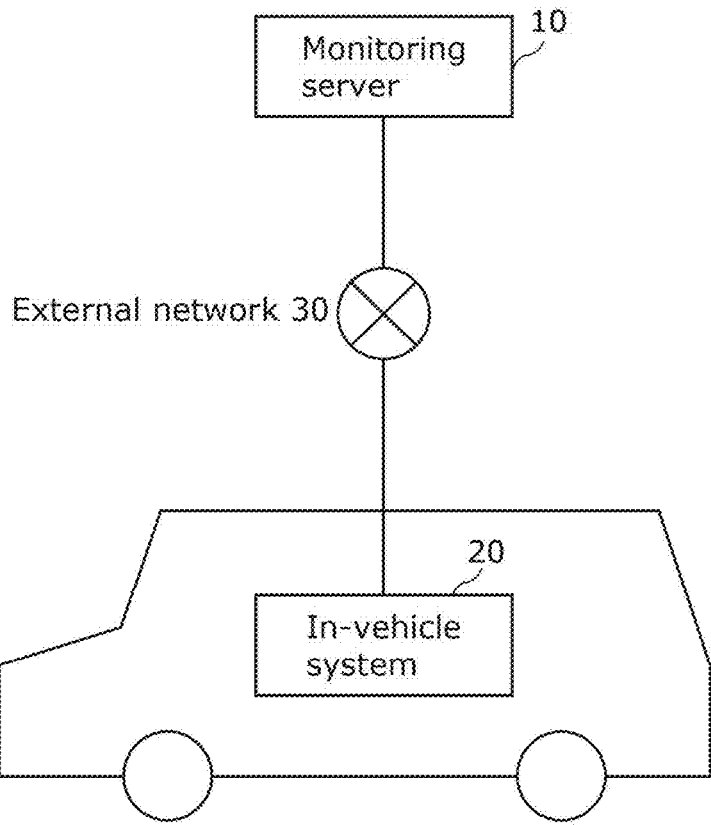
FIG. 1 is a general configuration diagram of a monitoring system in an embodiment.

Underlying Knowledge Forming Basis of the Present Disclosure

As automobiles have recently become increasingly connected, intrusion detection systems (IDSs) that detect an anomaly (threat) caused by an entrance of an in-vehicle network from outside a vehicle have been increasingly introduced to prepare for IT-based threats, which are expected to increase in the future. A security operation center (SOC) is notified of a result (log) of an anomaly detected by an IDS, analyzes an anomaly in an automobile, and responds to the anomaly or recovers from the anomaly.

However, an IDS, as well as a monitoring target, can also be a target of attack, and a result of detecting an anomaly from an IDS that may have been attacked has a low reliability level. Since the result of detecting an anomaly is analyzed by the SOC, the analysis by the SOC may be incorrect if the result of detecting an anomaly has a low reliability level.

In addition, a verification device that verifies (checks for occurrence of an anomaly in) an IDS is required to have a higher security privilege than the IDS or to be isolated with a higher-level security privilege. However, inappropriate privilege settings may lead to the following problems. For example, if a security privilege of a verification device is excessively higher than a security privilege of a monitoring target, it is difficult to closely check operation and settings of the monitoring target. Conversely, if a security privilege of a verification device is at the same level as a security privilege of a monitoring target, a level of attacks that can be responded to (i.e., a bearable threat) decreases.

Thanks to the evolution of automotive architectures, there is a known technique to integrate functions of a plurality of electronic control units (ECUs) into one ECU using a virtualization technology. In addition, there is known a runtime integrity (RI) technique in which these ECUs each have a function of an IDS or a verification device and which ensures that the IDSs operate as expected. The functions of the plurality of ECUs based on the virtualization technology are implemented with programs and can be periodically updated. For this reason, it is necessary to detect whether an anomaly has occurred while preparing dynamic changes of configurations of the programs. As described above, when a program to be executed is updated, it is difficult for related art such as PTL 1 to update the program while maintaining a chain of trust.

To solve the above-described problem, the present inventors have come to find a verification system and the like that enable, when a program is to be updated, the program to be updated while maintaining a chain of trust, without restarting the entire system.

A verification system according to Aspect 1 of the present disclosure includes: a first verification device that verifies integrity of a first verification target; and a second verification device that has a higher security privilege than the first verification device and verifies integrity of the first verification device. The first verification device includes a first memory and a first processor coupled to the first memory. The first processor, by using the first memory, operates as: a first verifier that refers to first verification related information including first verification target information and a first expected value, the first verification target information indicating the first verification target, the first expected value being generated by performing a predetermined operation on first data on a first program implementing the first verification target, generates a first verification value by performing the predetermined operation on data on a first storage area storing the first program implementing the first verification target indicated by the first verification target information, and verifies the integrity of the first verification target by comparing the first verification value with the first expected value; and a first updater that accepts, when the first program is updated, a first update request for updating the first verification related information when receiving the first update request from the second verification device or when receiving the first update request while the first verification related information is updated, and that updates the first verification related information based on the accepted first update request.

Accordingly, the first verification device limits situations of accepting the first update request for updating the first verification related information in the case of updating the first program. It is thus possible to prevent the first verification related information from being updated freely. This is because the first update request transmitted from the second verification device, which has a higher security privilege than the first verification device or the first update request already accepted during the update of the first verification related information can be determined to be more likely to be normal.

A verification system according to Aspect 2 of the present disclosure is the verification system according to Aspect 1 further includes the first verification target. The first verification target is a third verification device. The third verification device verifies integrity of a second verification target different from the first verification target and has a lower security privilege than the first verification device. The third verification device includes a second memory and a second processor coupled to the second memory. The second processor, by using the second memory, operates as: a second verifier that refers to second verification related information including second verification target information and a second expected value, the second verification target information indicating the second verification target, the second expected value being generated by performing the predetermined operation on second data on a second program implementing the second verification target, generates a second verification value by performing the predetermined operation on data on a second storage area storing the second program implementing the second verification target indicated by the second verification target information, and verifies the integrity of the second verification target by comparing the second verification value with the second expected value; and a second updater that updates, when receiving a second update request for updating the second verification related information from the first verification device, the second verification related information based on the received second update request, and during a predetermined period in updating of the first verification related information, the first verification device transmits the second update request to the third verification device.

When the second verification related information is updated, the first verification related information may lose its consistency under the influence of the update. For this reason, during the period in the update of the first verification related information, the first verification device transmits the second update request to the third verification device to cause the third verification device to update the second verification related information. As a result, the second verification related information can be updated before the update of the first verification related information is completed, and the first verification related information can be updated with its consistency kept.

A verification system according to Aspect 3 of the present disclosure is the verification system according to Aspect 2. The third verification device transmits completion information to the first verification device after updating of the second verification related information is completed. The completion information indicates completion of the updating of the second verification related information. When the second verification related information is updated, the first verification device does not update the first verification related information but transmits the second update request to the third verification device and, after receiving the completion information from the third verification device, updates the first verification related information.

Accordingly, the first verification device updates the first verification related information after the update of the second verification related information by the third verification device is completed, and thus the first verification related information can be updated with its consistency kept.

A verification system according to Aspect 4 of the present disclosure is the verification system according to Aspect 2 or 3. When the first storage area is changed as a result of the updating of the second verification related information, the third verification device transmits first area information indicating the changed first storage area to the first verification device, and the first verification device updates the first verification target information based on the first area information.

Accordingly, the first verification device updates the first verification target information based on the second area information affected by the update of the second verification related information by the third verification device, and thus the first verification related information can be updated with its consistency kept.

A verification system according to Aspect 5 of the present disclosure is the verification system according to any one of Aspects 1 to 4. When a third storage area that stores a third program implementing the first verification device is changed as a result of the updating of the first verification related information, the first verification device transmits third area information indicating the changed third storage area to the second verification device.

Accordingly, the second verification device can receive the third area information affected by the update of the first verification related information by the first verification device and can thus specify the third storage area easily. As a result, the second verification device can determine the integrity of the first verification device.

A verification system according to Aspect 6 of the present disclosure is the verification system according to any one of Aspects 1 to 5. The verification system includes a plurality of verification devices including the first verification device and the second verification device. Each verification device of the plurality of verification devices verifies integrity of another verification device that has a lower security privilege than the verification device. Out of the plurality of verification devices, a highest-level verification device having a highest security privilege is implemented in a secure area, and one or more low-level verification devices that are the plurality of verification devices other than the highest-level verification device is implemented in a normal area.

A verification system according to Aspect 7 of the present disclosure is the verification system according to any one of Aspects 1 to 6. Updating of the first program is any one of deleting the first program, modifying the first program, or adding another program. After the updating of the first program is completed and after updating of the first verification related information is completed, the first verification device executes the updated first program.

A verification system according to Aspect 8 of the present disclosure is a verification method by a verification system that includes a first verification device and a second verification device. The first verification device verifies integrity of a first verification target. The second verification device has a higher security privilege than the first verification device and verifies integrity of the first verification device. The first verification device: refers to first verification related information including first verification target information and a first expected value, the first verification target information indicating the first verification target, the first expected value being generated by performing a predetermined operation on first data on a first program implementing the first verification target, generates a first verification value by performing the predetermined operation on data on a first storage area storing the first program implementing the first verification target indicated by the first verification target information, and verifies the integrity of the first verification target by comparing the first verification value with the first expected value; and accepts, when the first program is updated, a first update request for updating the first verification related information when receiving the first update request from the second verification device or when receiving the first update request while the first verification related information is updated, and updates the first verification related information based on the accepted first update request.

A recording medium according to Aspect 9 of the present disclosure is a non-transitory computer-readable recording medium storing a program for causing a computer to execute the verification method according to Aspect 8.

It is to be noted that these general and specific aspects may be implemented using a system, a method, an integrated circuit, a computer program, or a computer readable recording medium such as a CD-ROM, or any combination of systems, methods, integrated circuits, computer programs, or recording media.

Hereinafter, the specific example of a monitoring system according to one aspect of the present disclosure is described with reference to the drawings. The embodiment described here is one specific example of the present disclosure. Accordingly, the numerical values, shapes, structural elements, the arrangement and connection form of the structural elements, steps, the processing order of the steps, etc. shown in the following embodiment are mere examples, and thus are not intended to limit the present disclosure. Among the structural elements described in the following embodiment, structural elements not recited in any one of the independent claims are optional.

Embodiment

[General Configuration Diagram of Monitoring System]

FIG. 1 is a general configuration diagram of a monitoring system in an embodiment.

The monitoring system includes monitoring server 10 and in-vehicle system 20. Monitoring server 10 and in-vehicle system 20 are connected together over external network 30.

External network 30 is, for example, the Internet. External network 30 is not limited to the Internet. External network 30 may be a dedicated communication line. A communication method of external network 30 may be either a wired or wireless one. A wireless communication system may be Wi-Fi (registered trademark), 3G/long term evolution (LTE), Bluetooth (registered trademark), or a V2X communication system, which are existing technologies.

Monitoring server 10 is a device that obtains, from in-vehicle system 20, a monitoring result that is information about a security state of in-vehicle system 20 and displays the monitoring result through a graphical user interface. For example, monitoring server 10 is used in a security operation center by a security analyst checking the monitoring result and considering taking measures, such as updating a program, when an anomaly occurs in in-vehicle system 20.

In-vehicle system 20 is a device that performs communication control, vehicle control, video output, and the like, monitors the security state of in-vehicle system 20, and notifies monitoring server 10 of the result of monitoring the security state. Although FIG. 1 illustrates only one in-vehicle system 20, each of one or more in-vehicle systems 20 transmits the result of monitoring the security state to monitoring server 10. In-vehicle system 20 will be described in detail below.

[General Configuration Diagram of In-Vehicle System 20]

Figure 2:
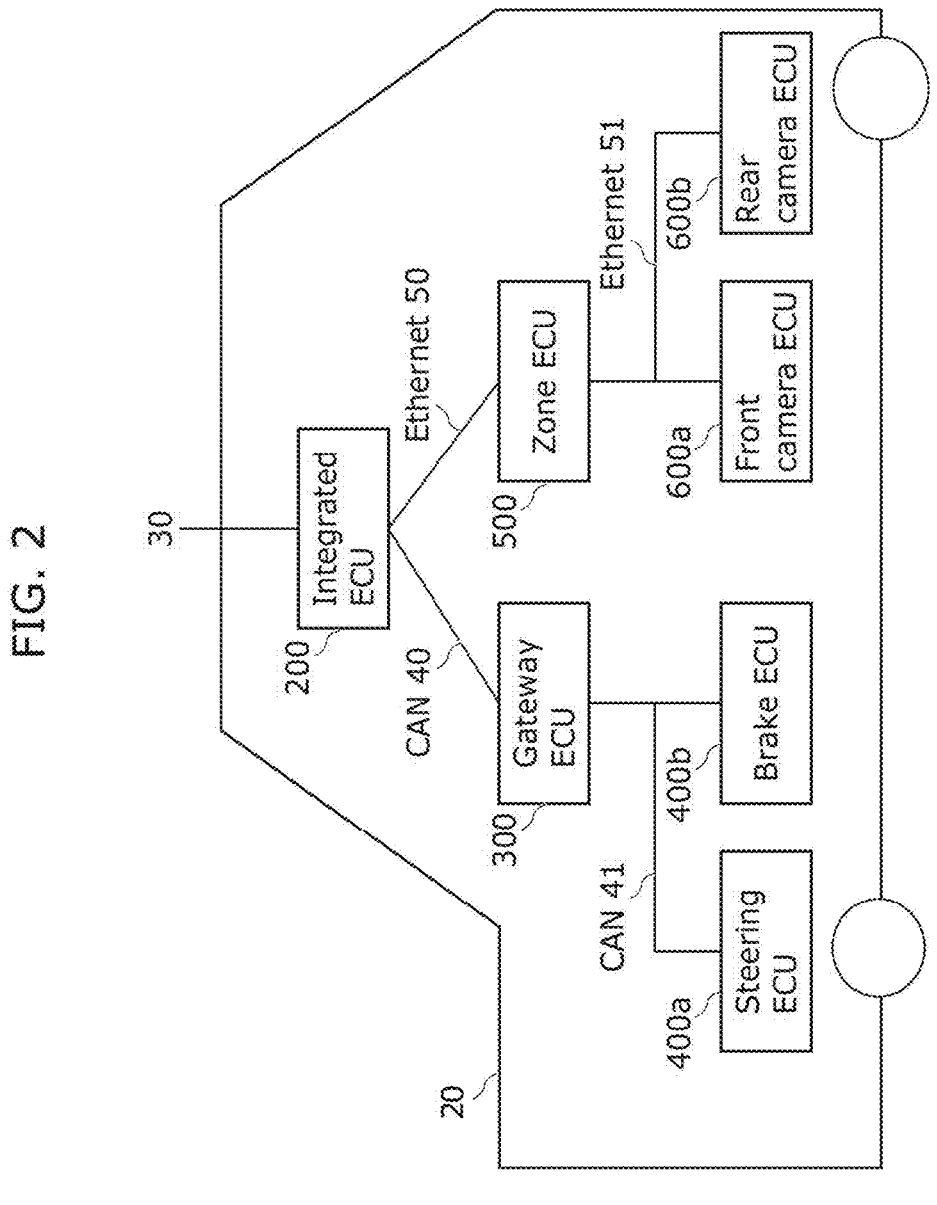
FIG. 2 is a configuration diagram illustrating an in-vehicle system in the embodiment.

FIG. 2 is a configuration diagram illustrating the in-vehicle system in the embodiment.

In-vehicle system 20 includes integrated ECU 200, gateway ECU 300, steering ECU 400a, brake ECU 400b, Zone ECU 500, front camera ECU 600a, and rear camera ECU 600b.

Integrated ECU 200 and gateway ECU 300 are connected together over control area network (CAN) 40, which is a CAN, a type of network protocol. The network protocol used here is not limited to the CAN and may be a network protocol used in an in-vehicle system, such as CAN-FD or FlexRay protocol.

Gateway ECU 300, steering ECU 400a, and brake ECU 400b are connected together over CAN 41.

Integrated ECU 200 and Zone ECU 500 are connected together over Ethernet 50, which is a protocol based on Ethernet (registered trademark), a type of a network protocol. Ethernet 50 is, for example, Scalable service-Oriented MiddlewarE over IP (SOME/IP) protocol. The network protocol used here need not be the SOME/IP and may be a network protocol used in an in-vehicle system, such as SOME/IP-SD or CAN-XL.

Zone ECU 500, front camera ECU 600a, and rear camera ECU 600b are connected together over Ethernet 51. Ethernet 51 may be based on the same network protocol as Ethernet 50 or based on a different network protocol.

Integrated ECU 200 and monitoring server 10 are connected together over external network 30.

Integrated ECU 200 is an ECU performing the communication control that transmits and receives messages over external network 30, CAN 40, and Ethernet 50, the vehicle control that instructs, over CAN 40 and Ethernet 50, gateway ECU 300 and Zone ECU 500 to control the vehicle, and the video output to an infotainment system or an instrument panel. Integrated ECU 200 is also an ECU that monitors a security state of integrated ECU 200 and notifies monitoring server 10 of the result of the monitoring. Integrated ECU 200 will be described in detail later.

Gateway ECU 300 is an ECU that mediates messages transmitted and received between integrated ECU 200, and steering ECU 400a and brake ECU 400b.

Steering ECU 400a is an ECU that controls steering using a steering wheel installed in the vehicle.

Brake ECU 400b is an ECU that controls brakes installed in the vehicle.

In-vehicle system 20 implements control pertaining to traveling of the vehicle such as traveling, turning, and stopping of the vehicle by using ECUs that control an engine and the body of the vehicle, as well as steering ECU 400a and brake ECU 400b.

Zone ECU 500 is an ECU that mediates messages transmitted and received between integrated ECU 200, and front camera ECU 600a and rear camera ECU 600b.

Front camera ECU 600a is an ECU that obtains a video from a camera mounted at a front part of the vehicle and capturing a video of the front of the vehicle.

Rear camera ECU 600b is an ECU that obtains a video from a camera mounted at a rear part of the vehicle and capturing a video of the rear of the vehicle.

Although FIG. 2 illustrates only the front camera ECU and the rear camera ECU, an advanced driver assistance system such as automated driving, adaptive cruise control, or automated parking may be implemented using an ECU that collects information from various sensors such as GPS.

[Configuration Diagram of Integrated ECU]

Figure 3:
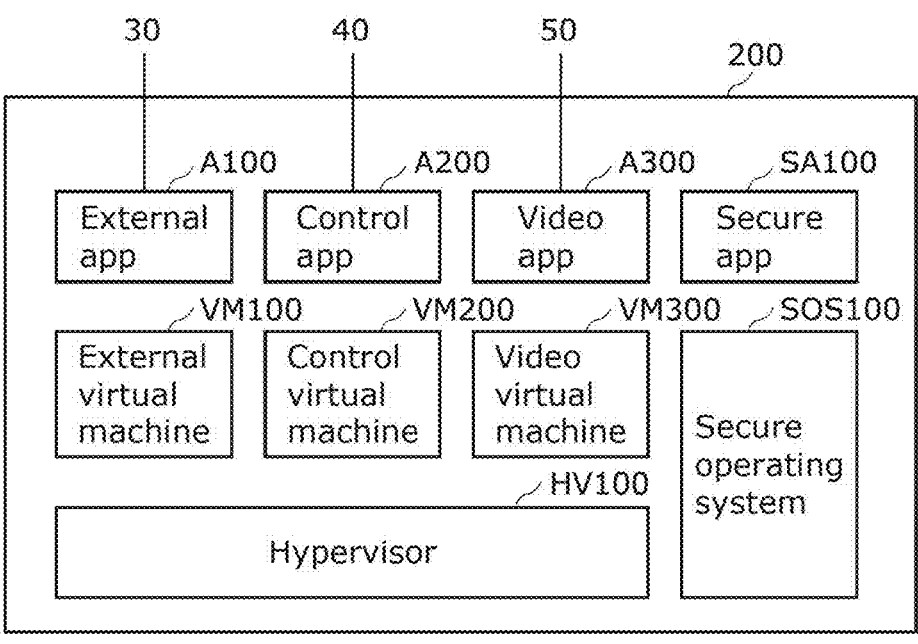
FIG. 3 is a configuration diagram of an integrated ECU in the embodiment.

FIG. 3 is a configuration diagram of integrated ECU 200 in the embodiment. Integrated ECU 200 includes external app A100, control app A200, video app A300, external virtual machine VM100, control virtual machine VM200, video virtual machine VM300, hypervisor HV100, secure app SA100, and secure operating system SOS100. Hereinafter, external app A100, control app A200, and video app A300 may be collectively referred to as applications. In addition, external virtual machine VM100, control virtual machine VM200, and video virtual machine VM300 may be collectively referred to as virtual machines. Integrated ECU 200 is an example of the verification system.

Hypervisor HV100 is a virtualization software platform such as a hypervisor. Hypervisor HV100 is software that executes and manages one or more virtual machines. In general, hypervisors are classified into bare-metal hypervisors called Type-1 and hosted hypervisors called Type-2. In embedded systems, Type-1 is generally used with consideration given to overhead of processing by the hypervisor.

Type-1 hypervisors have small code sizes and are thus unlikely to involve vulnerability, and the hypervisors are supposed to be trusted compared with the applications and the virtual machines.

The embodiment will be described with an example in which a virtualization system is implemented by a Type-1 hypervisor. However, the virtualization system may be implemented by a Type-2 hypervisor or may be implemented by a containerized virtualization application.

Secure operating system SOS100 is a trusted operating system that is implemented to be vulnerability-free. Furthermore, secure operating system SOS100 is supposed to be the most trusted of the applications, virtual machines, and hypervisor HV100 because pieces of operating system software are verified from a root of trust (ROT), which is trusted hardware, at system startup. Secure operating system SOS100 is implemented using, for example, control by an execution environment called trusted execution environment (TEE). Secure operating system SOS100 can be implemented by, for example, a TrustZone mechanism, which is one of the standard functions of ARM-based central processing units (CPUs) in the Cortex-A family. Secure operating system SOS100 can also be implemented by Apple's secure enclave processor (SEP), Google's TitanM, or the like.

Secure app SA100 is a trusted application that is implemented to be vulnerability-free. Secure app SA100 operates on secure operating system SOS100, which is trusted, and thus can be supposed to be more trustworthy than the applications, the virtual machines, and hypervisor HV100. At the same time, since the implementation of secure app SA100 is required to be vulnerability-free, the program of secure app SA100 is required to be simple.

External app A100 is an application that communicates with monitoring server 10 over external network 30. External app A100 is connected to external network 30, which can serve as an entry point for an attacker. Thus, external application A100 can be supposed to be vulnerable compared with control app A200 and video app A300, which are not connected to external network 30.

External virtual machine VM100 is an operating system that causes external app A100 to operate. External virtual machine VM100 causes external app A100, which can serve as an entry point for an attacker, to operate. Thus, external virtual machine VM100 can be supposed to be vulnerable compared with control virtual machine VM200 and video virtual machine VM300.

Control app A200 is an application that communicates with gateway ECU 300 over CAN 40 to control operation pertaining to traveling of the vehicle including in-vehicle system 20. Control app A200 is not connected to external network 30 and thus can be supposed to be trustworthy compared with external app A100. Furthermore, control app A200 is designed and implemented to be secure because a functional safety standard is applied to the development of software relating to the control of operations pertaining to the traveling of a vehicle. For this reason, control app A200 can be supposed to be trustworthy compared with external app A100. However, if control application A200 is hacked, an attacker can use functions of controlling the operations pertaining to the traveling of the vehicle. Thus, control app A200 can be supposed to have a significant impact on the operations pertaining to the traveling of the vehicle.

Control virtual machine VM200 is an operating system that causes control app A200 to operate. Control virtual machine VM200 is not connected to external network 30 and thus can be supposed to be unlikely to serve as an entry point for an attacker. Furthermore, control virtual machine VM200 is designed and implemented to be secure because a functional safety standard is applied to the development of software relating to the control of operations pertaining to the traveling of a vehicle. For this reason, control virtual machine VM200 can be supposed to be trustworthy compared with external app A100 or external virtual machine VM100. However, if control virtual machine VM200 is hacked, an attacker can use the functions of controlling the operations pertaining to the traveling of the vehicle. Thus, control virtual machine VM200 can be supposed to have a significant impact compared with a case where external virtual machine VM100 or video virtual machine VM300 is hacked.

Video app A300 is an application that communicates Zone ECU 500 over Ethernet 50 to obtain videos or the like from the cameras and to output a video on the infotainment system, the instrument panel, or a head-up display. The videos from the cameras are also used as information for implementing the advanced driver assistance system such as automated driving. Video app A300 is not connected to external network 30. Thus, video app A300 is unlikely to serve as an entry point for an attacker and can be supposed to be trustworthy compared with external app A100. In addition, if video app A300 is hacked, an attacker cannot use the functions of controlling the operations pertaining to the traveling of the vehicle. Thus, video app A300 can be supposed to have a minor impact on the operations pertaining to the traveling of the vehicle compared with a case where control virtual machine VM200 is hacked.

Video virtual machine VM300 is an operating system that causes video app A300 to operate. Video virtual machine VM300 is not connected to external network 30. Thus, video virtual machine VM300 is unlikely to serve as an entry point for an attacker and can be supposed to be trustworthy compared with external app A100. In addition, if video virtual machine VM300 is hacked, an attacker cannot use the functions of controlling the operations pertaining to the traveling of the vehicle. Thus, video virtual machine VM300 can be supposed to have a minor impact on the operations pertaining to the traveling of the vehicle compared with a case where control virtual machine VM200 is hacked.

Here, an execution privilege of each program will be described. In general, a CPU can assign a plurality of privilege levels to each program. This corresponds to, for example, exception level (EL) in ARM-based CPUs and to protection ring in Intel-based CPUs. Furthermore, a CPU can execute a program securely by using a TEE to control two types of execution environments: a secure world and a normal world. In general, with the privilege levels and by controlling the two types of execution environments, five types of execution privileges (security privileges) are used properly. In the embodiment, the strongest secure execution privilege (PL4) (i.e., the highest security privilege) is assigned to secure operating system SOS100, the next strongest secure execution privilege (PL3) (i.e., the next highest security privilege) is assigned to an application on the operating system (i.e., secure app SA100), the next strongest execution privilege (PL2) is assigned to hypervisor HV100, the next strongest execution privilege (PL1) is assigned to the virtual machine (i.e., external virtual machine VM100, control virtual machine VM200, and video virtual machine VM300), and the weakest execution privilege (PL0) (i.e., the lowest security privilege) is assigned to the applications on the virtual machines (i.e., external app A100, control app A200, and video app A300). It is basically difficult for a program that operates with a weak execution privilege to tamper with software that operates with a strong execution privilege. However, even with a strong execution privilege, software is likely to be tampered due to its vulnerability or an imperfection in its design. Thus, the software operating with a strong execution privilege is required to be a simple program.

As mentioned above, external app A100 has a low reliability because of being likeliest to be tampered with, and control app A200, video app A300, external virtual machine VM100, control virtual machine VM200, video virtual machine VM300, hypervisor HV100, secure app SA100, and secure operating system SOS100 are less likely to be tampered with that decrease in this order. Being unlikely to be tampered with means being high in reliability.

Here, an attack scenario of an attacker will be described. The attacker abuses a vulnerability of external app A100 to enter external virtual machine VM100 from external network 30 and gains a user privilege. Then, the attacker exploits a vulnerability of a system call or the like of external virtual machine VM100 to gain a kernel privilege of external virtual machine VM100. Then, the attacker exploits a vulnerability of a hypercall or the like of hypervisor HV100 to gain a privilege of hypervisor HV100 or a privilege of control virtual machine VM200 or video virtual machine VM300. Here, the hypercall is, for example, a privilege instruction for giving an instruction to perform internal communication between virtual machines and an instruction to start up or shut down a virtual machine.

In the above-mentioned attack scenario, a security mechanism is supposed to be introduced to the applications, the virtual machines, hypervisor HV100, and secure app SA100 to track the behavior of the attacker precisely. The security mechanism includes an application verification device, a virtual machine verification device, HV verification device HV110, and SA verification device SA110, which will be described later.

Note that integrated ECU 200 is provided with a function of managing fuel, a power supply status, and a fuel supply status, a function of issuing an emergency alert when an anomaly such as an accident occurs in the system, a function of controlling vehicle diagnosis, a function of monitoring connection to an external device, which are however omitted in FIG. 3.

[Details of Configuration Diagram of Integrated ECU]

Figure 4:
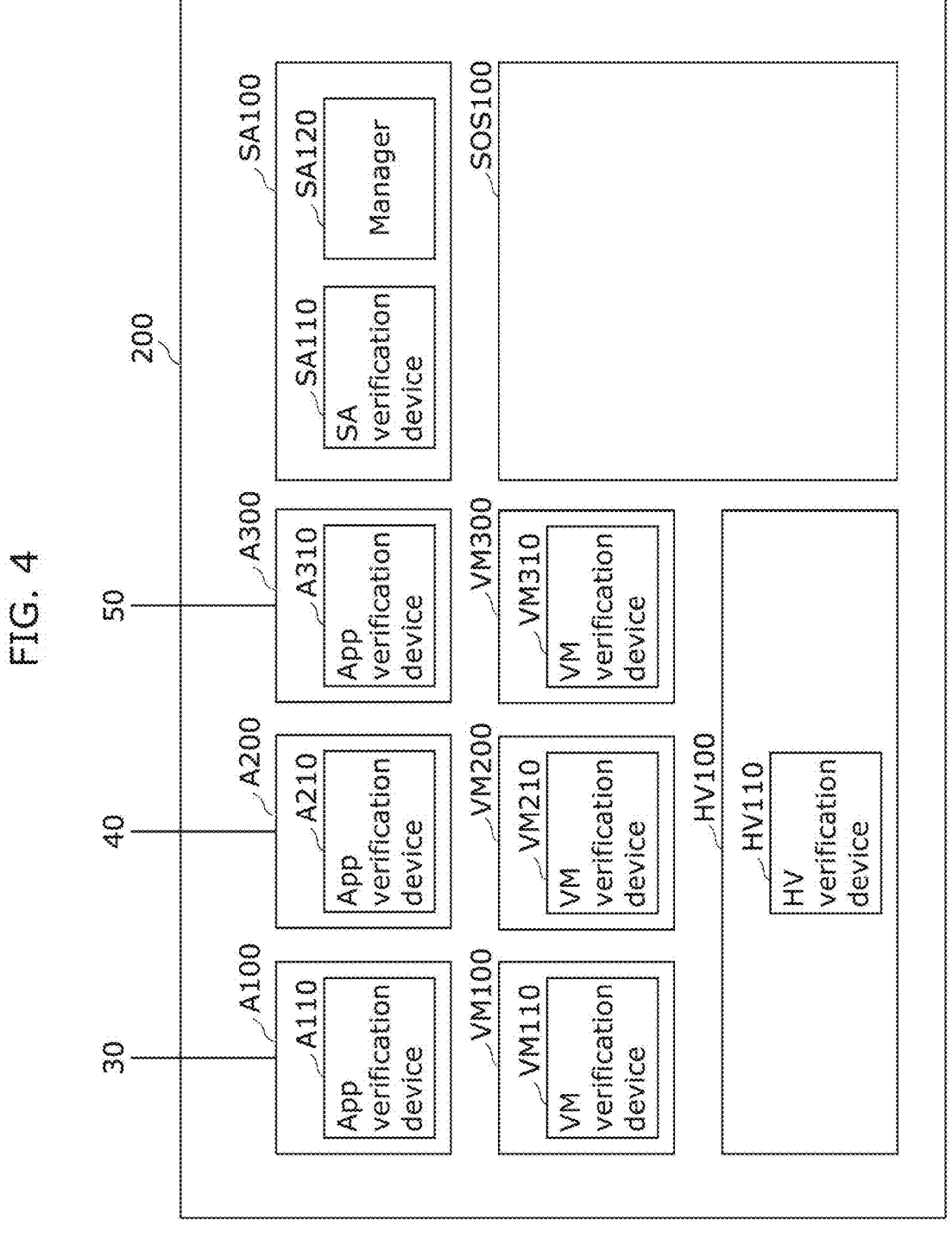
FIG. 4 is a diagram illustrating details of the configuration diagram of the integrated ECU in the embodiment.

FIG. 4 is a diagram illustrating details of the configuration diagram of the integrated ECU in the embodiment.

External app A100 includes app verification device A110 that monitors external communication and software in an app area, control app A200 includes app verification device A210 that monitors CAN communication, and software in an app area, and video app A300 includes app verification device A310 that monitors Ethernet communication and software in an app area. Note that the software in the app area is software in a user area. Hereinafter, app verification device A110, app verification device A210, and app verification device A310 may be collectively referred to as application verification devices. External virtual machine VM100 includes VM verification device VM110 that monitors system calls, hypercalls, software in a VM area (also referred to as an OS area or a kernel area), and software in an app area, control virtual machine VM200 includes VM verification device VM210 that monitors system calls, hypercalls, software in a VM area (also referred to as an OS area or a kernel area), and software in an app area, and video virtual machine VM300 includes VM verification device VM310 that monitors system calls, hypercalls, software in a VM area (also referred to as an OS area or a kernel area), and software in an app area. Hereinafter, VM verification device VM110, VM verification device VM210, and VM verification device VM310 may be collectively referred to as virtual machine verification devices. Hypervisor HV100 includes HV verification device HV110 that monitors software in an HV area and software in a VM area. Secure app SA100 includes SA verification device SA110 that monitors software in an HV area and software in a VM area and manager SA120 that manages monitoring information. Hereinafter, the application verification devices, the virtual machine verification devices, HV verification device HV110, and SA verification device SA110 may be collectively referred to as multilayer verification devices. The monitoring information will be described in detail later. The applications, the application verification devices, the virtual machines, the virtual machine verification devices, hypervisor HV100, HV verification device HV110, secure app SA100, and SA verification device SA110 will be described in detail later.

[Chain of Trust]

Figure 5:
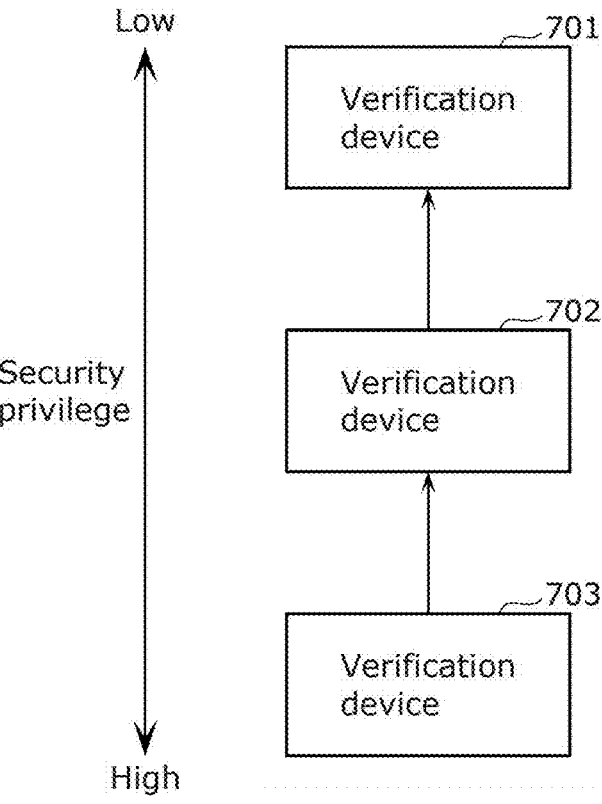
FIG. 5 is a diagram for describing a chain of trust in the embodiment.

FIG. 5 is a diagram for describing a chain of trust in the embodiment.

The plurality of verification devices constituting integrated ECU 200 forms a chain of trust as described with reference to FIG. 3 and FIG. 4. As illustrated in FIG. 5, the verification system includes a plurality of verification devices 701, 702, and 703 that differ from one another in at least security privilege. Verification device 703 has a higher security privilege than verification device 702 and verifies the integrity of verification device 702. Verification device 702 has a higher security privilege than verification device 701 and verifies the integrity of verification device 701. Verification device 701 is an example of a third verification device. Verification device 702 is an example of a first verification device. Verification device 703 is an example of a second verification device.

Any one of the virtual machine verification devices, HV verification device HV110, or SA verification device SA110 in FIG. 4 is an example of verification device 703. Any one of the virtual machine verification devices or HV verification device HV110 in FIG. 4 is an example of verification device 702. Any one of the application verification devices, the virtual machine verification devices, or HV verification device HV110 in FIG. 4 is an example of verification device 701.

As seen from the above, the verification system includes a plurality of verification devices including verification devices 701, 702, and 703. Each of the plurality of verification devices verifies the integrity of another verification device that has a lower security privilege than the verification device. Out of the plurality of verification devices, a highest-level verification device having the highest security privilege may be implemented in a secure area. In addition, one or more low-level verification devices, which are the plurality of verification devices other than the highest-level verification device, may be implemented in a normal area.

[Verification Device]

Figure 6:
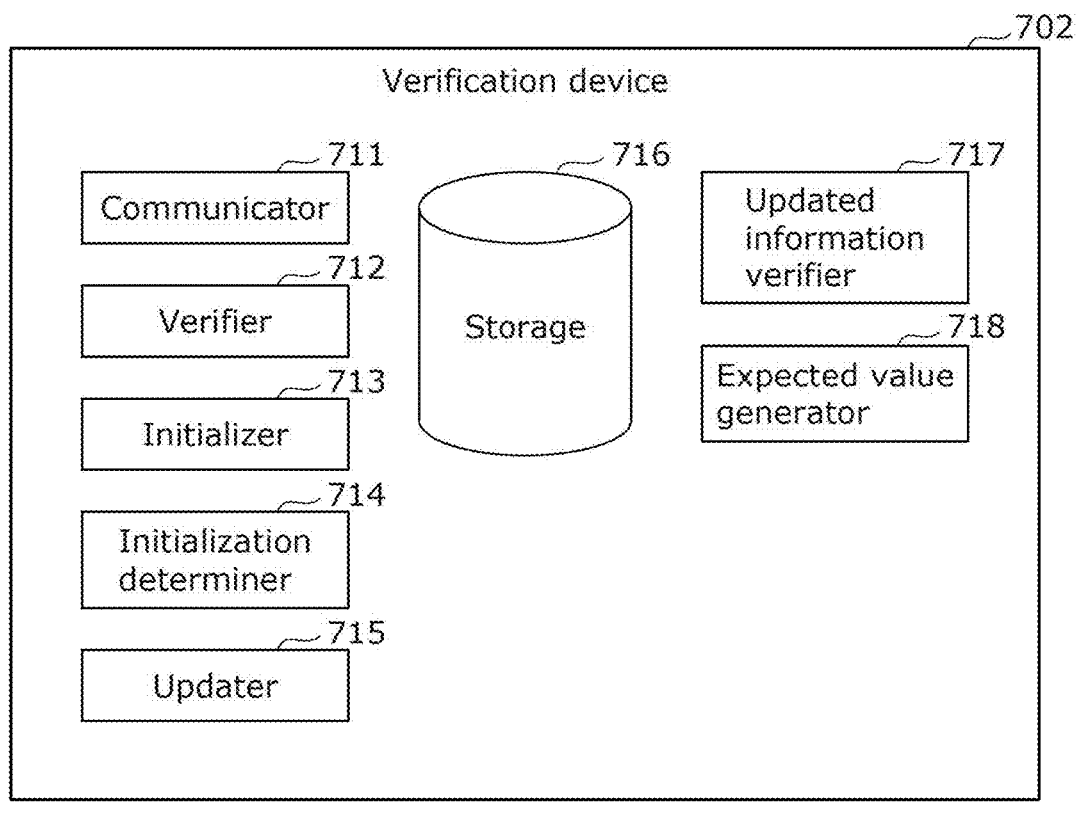
FIG. 6 is a block diagram illustrating an example of a specific configuration of a verification device according to the embodiment.

FIG. 6 is a block diagram illustrating an example of a specific configuration of verification device 702 according to the embodiment.

Verification device 702 includes communicator 711, verifier 712, initializer 713, initialization determiner 714, updater 715, storage 716, updated information verifier 717, and expected value generator 718.

Communicator 711 exchanges information with the devices other than verification device 702.

Verifier 712 verifies the integrity of verification device 701 based on first verification related information. The first verification related information includes first verification target information that indicates a first verification target (i.e., verification device 701) to be verified by verification device 702 and a first expected value to be used in the verification. The first verification related information may be a table in which the first verification target information and the first expected value are associated with each other. The first verification related information is, for example, information that includes IDs for identifying a verifying device (here, verification device 702) and a device to be verified (here, verification device 701), an address of a first storage area in which a first program implementing the device to be verified is stored, and the first expected value. Note that the first verification target information and the first expected value may be items of information in separate tables. In this case, the first verification target information is information that includes the IDs for identifying the verifying device (here, verification device 702) and the device to be verified (here, verification device 701) and the address of the first storage area in which the first program implementing the device to be verified is stored, and the first expected value is information that includes the IDs for identifying the verifying device (here, verification device 702) and the device to be verified (here, verification device 701) and an expected value of verification device 701. Note that the first verification related information may be omitted because the first verification related information is stored in verification device 702, and because verification device 702 is known to be the verifying device.

The first expected value is a value generated by performing a predetermined operation on data on the first program, which implements verification device 701, and that is normal and has not been attacked. For example, the first expected value may be generated when the first program is generated, or the first expected value may be generated when the first program is first started up. Verifier 712 generates a first verification value by performing the predetermined operation on data stored in the first storage area that stores the first program implementing the first verification target indicated by the first verification target information, and verifier 712 verifies the integrity of the verification target by comparing the generated first verification value with the first expected value. When the first verification value matches the first expected value, verifier 712 determines that verification device 701 is normal, and when the first verification value does not match the first expected value, verifier 712 determines that verification device 701 is abnormal.

Here, the predetermined operation may be, for example, a hash operation to calculate a hash value. An expected value may be a hash value that is obtained by performing the hash operation on a normal program. In addition, the verification value may be a hash value that is obtained by performing, in verification, the hash operation on data on a storage area that stores a verification target program. The predetermined operation is not limited to a hash operation as long as the predetermined operation is a reproducible operation that uniquely converts a first value into a second value paired with the first value.

Initializer 713 executes initialization processing on a verification target program that has not been started up. Specifically, initializer 713 performs verification (e.g., checking a digital signature or checking for tampering) on the program and then starts up the verification target program.

Initialization determiner 714 determines whether to execute the initialization processing by initializer 713. For example, initialization determiner 714 may determine to execute the initialization processing when a secure timer issues an interrupt, when a predetermined interval elapses, or when initialization determiner 714 accepts an instruction to execute the initialization processing from the outside.

Updater 715 updates a third program that implements verification device 702 in response to an update request for updating the third program when receiving the update request from verification device 703. In response to the update request, updater 715 may transmit an update request for updating the first program to verification device 701. When the first program implementing verification device 701 is updated, updater 715 accepts a first update request for updating the first verification related information when receiving the first update request from verification device 703 or when receiving the first update request while the first verification related information is updated. Then, updater 715 updates the first verification related information based on the accepted first update request. In addition, when accepting an update request to verification device 701, updater 715 synchronizes verification processing between verification device 701 and verification device 702.

In addition, during a predetermined period in the update of the first verification related information, updater 715 transmits a second update request for updating second verification related information to verification device 701.

Here, the second verification related information includes second verification target information that indicates a second verification target to be verified by verification device 701 and a second expected value to be used in the verification. The second expected value is a value generated by performing the predetermined operation on data on a second program, which implements the second verification target, and that is normal and has not been attacked. For example, the second expected value may be generated when the second program is generated, or the second expected value may be generated when the second program is first started up.

When the second verification related information is updated, updater 715 does not update the first verification related information but transmits the second update request to verification device 701 and, after receiving completion information indicating the completion of updating the second verification related information from verification device 701, updates the first verification related information. When the first storage area storing the first program is changed as a result of the updating of the second verification related information, updater 715 receives first area information that indicates the changed first storage area from verification device 701 and updates the first verification target information based on the received first area information.

Note that the update of the first program is any one of deleting the first program, modifying the first program, or adding another program. After the update of the first program is completed and after the update of the first verification related information is completed, verification device 702 executes the updated first program.

Storage 716 stores the first verification related information. That is, storage 716 stores the first verification target information that indicates the first verification target (i.e., verification device 701) to be verified by verification device 702 and the first expected value to be used in the verification. Storage 716 may store verification device information indicating verification device 703 that verifies verification device 702. That is, storage 716 may store information (the verification device information) indicating verification device 703 a verification target of which is verification device 702 and that has a high-level security privilege. Storage 716 may store a result (log) of the verification by verifier 712.

Updated information verifier 717 verifies the first update request for updating the first verification related information. Specifically, updated information verifier 717 determines the validity of the first update request. For example, updated information verifier 717 may check a digital signature to determine whether the first update request is information transmitted from a device that is permitted to be updated in advance. In this case, when the first update request is the information transmitted from the device that is permitted to be updated in advance, updated information verifier 717 determines the first update request is valid. Otherwise, updated information verifier 717 determines that the first update request is invalid. In addition, updated information verifier 717 may determine, for example, whether a timing of receiving the first update request is within a period in which the update can be performed. In this case, when the timing of receiving the first update request is within the period in which the update can be performed, updated information verifier 717 may determine that the first update request is valid. Otherwise, updated information verifier 717 may determine that the first update request is invalid. In addition, updated information verifier 717 may determine, for example, whether the first update request is tampered with. When the first update request is not tampered with, updated information verifier 717 may determine that the first update request is valid, and when the first update request is tampered with, updated information verifier 717 may determine that the first update request is invalid. Updated information verifier 717 may determine the validity of the first update request using at least two of the three determinations in combination.

Based on the verification device information indicating verification device 703 having the high-level security privilege, when the update of the first verification related information will affect the verification of verification device 702 performed by verification device 703, expected value generator 718 generates the expected value of verification device 703 based on the first verification related information. Specifically, when a third storage area that stores the third program implementing verification device 702 is changed, expected value generator 718 generates an expected value of third area information, which indicates the changed third storage area, and transmits the expected value to verification device 703.

As described above, verification device 702 performs processing for verification between verification device 703 having a higher security privilege and verification device 701 having a lower security privilege. Configurations of verification device 701 and verification device 703 are the same as verification device 702 and can be described by replacing reference numerals. Thus, the description of the configurations will be omitted. Note that, in a case where verification device 701 is a device having a lowest-level security privilege, the processing for verification device 701 in the above description of verification device 702 is omitted. In addition, in a case where verification device 703 is a device having a highest-level security privilege, the processing for verification device 703 in the above description of verification device 702 is omitted.

[Operation of Verification System]

Figure 7:
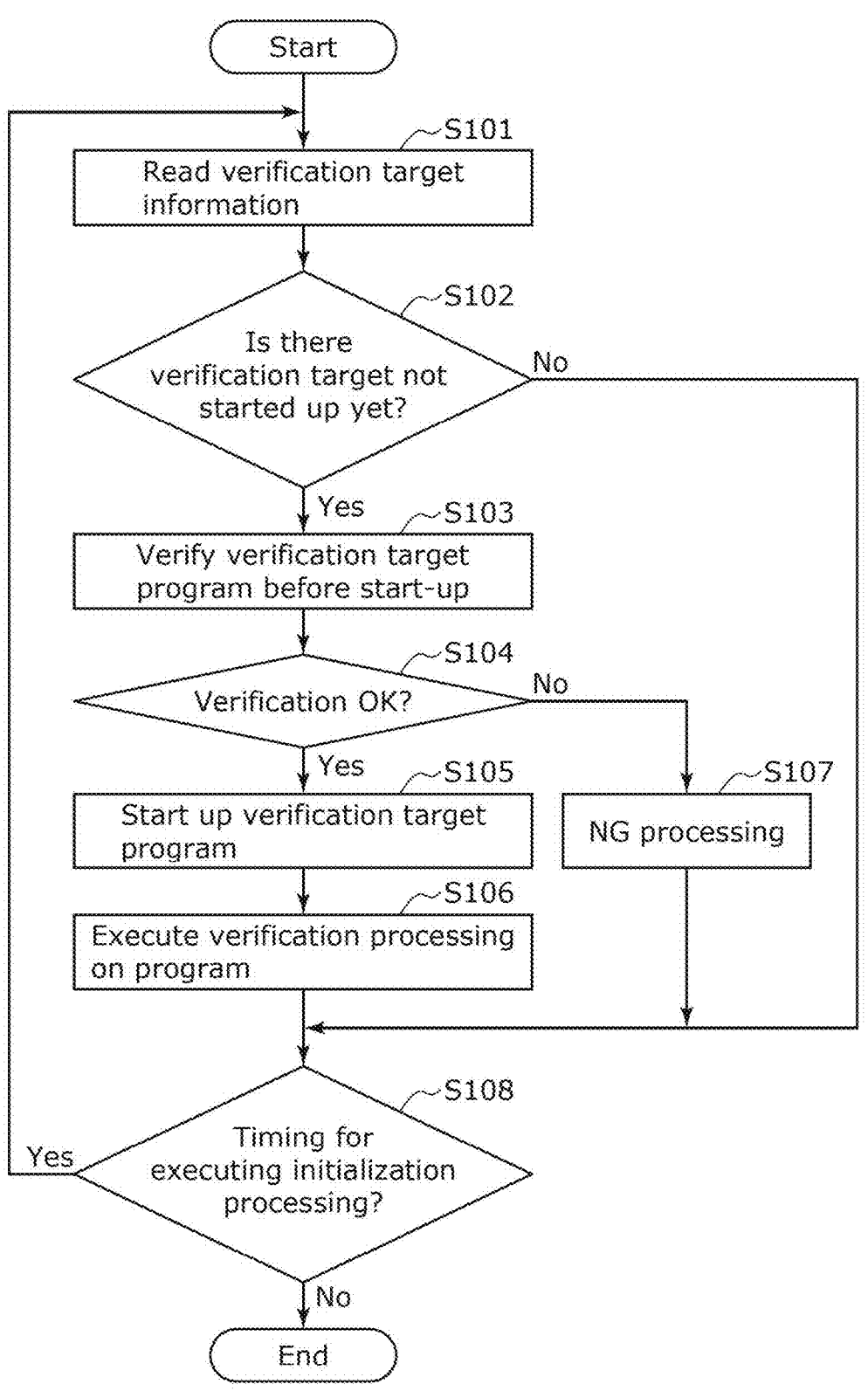
FIG. 7 is a flowchart illustrating an example of initialization processing by a verification system according to the embodiment.

FIG. 7 is a flowchart illustrating an example of the initialization processing by the verification system according to the embodiment.

Verification device 702 reads verification target information stored in storage 716 (S101). The processing in step S101 is processing by initializer 713.

Verification device 702 determines whether there is a device to be verified that has not been started up (S102). The processing in step S102 is processing by initializer 713.

When determining that there is a verification target that has not been started up (Yes in S102), verification device 702 verifies a verification target program (the first program implementing verification device 701) before the verification target is started up (S103). Step S103 is processing by initializer 713.

Verification device 702 determines whether the result of the verification in step S103 is verification OK (valid) (S104). Step S104 is processing by initializer 713.

When the result of the verification is verification OK in step S104 (Yes in S104), verification device 702 starts up the verification target program (S105). Step S105 is processing by initializer 713.

Verification device 702 executes verification processing of the first program implementing verification device 701 to be verified (S106). A specific example of the processing in step S106 will be described later with reference to FIG. 8.

When the result of the verification is verification NG in step S104 (No in S104), verification device 702 executes NG processing (S107).

When determining in step S102 that there is no device to be verified that has not been started up (No in S102), when step S106 is completed, or when step S107 is completed, verification device 702 determines whether it is a timing for executing the initialization processing (S108). The processing in step S108 is processing by initialization determiner 714.

When determining in step S108 that now is the timing for executing the initialization processing (Yes in S108), verification device 702 returns to step S101. When determining in step S108 that now is not the timing for executing the initialization processing (No in S108), verification device 702 terminates the initialization processing.

Figure 8:
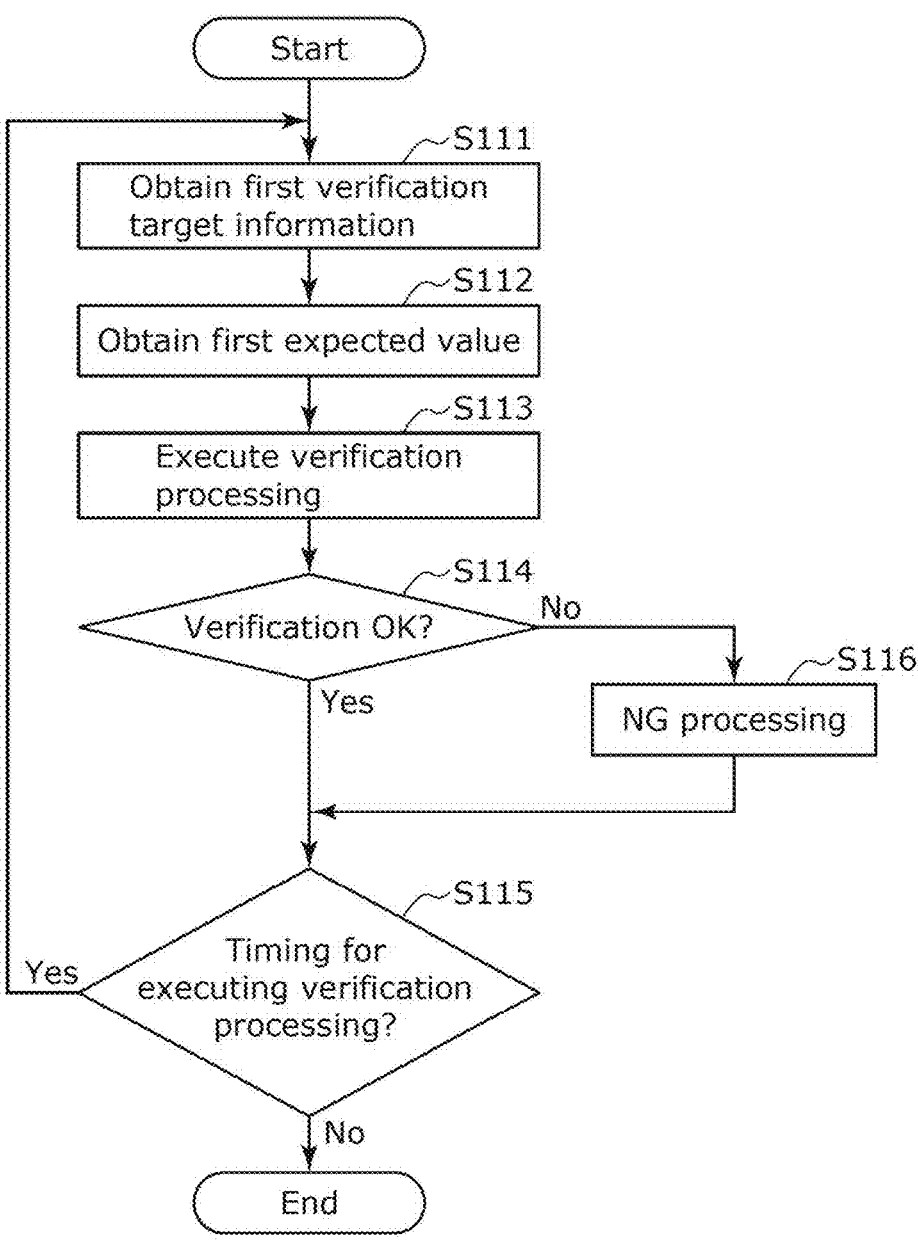
FIG. 8 is a flowchart illustrating an example of verification processing by the verification system according to the embodiment.

FIG. 8 is a flowchart illustrating an example of the verification processing by the verification system according to the embodiment.

Verification device 702 reads and obtains the first verification target information from storage 716 (S111).

Verification device 702 reads and obtains the first expected value from storage 716 (S112).

Verification device 702 generates the first verification value by performing the predetermined operation on data on the first storage area storing the first program implementing verification device 701 to be verified that is specified with the first verification target information, and verification device 702 verifies the integrity of the first verification target by comparing the first verification value with the first expected value (S113). Step S113 is processing by verifier 712.

Verification device 702 determines whether the result of the verification in step S113 is verification OK (normal) or not (abnormal) (S114). Step S114 is processing by verifier 712.

When the result of the verification is verification OK in step S114 (Yes in S114), verification device 702 determines whether it is a timing for executing the verification processing (S115).

When the result of the verification is NG in step S114 (No in S114), verification device 702 executes NG processing (S116). After completing the NG processing, verification device 702 proceeds to S115.

When determining in step S115 that now is the timing for executing the verification processing (Yes in S115), verification device 702 returns to step S111. When determining in step S115 that now is not the timing for executing the verification processing (No in S115), verification device 702 terminates the verification processing.

Figure 9:
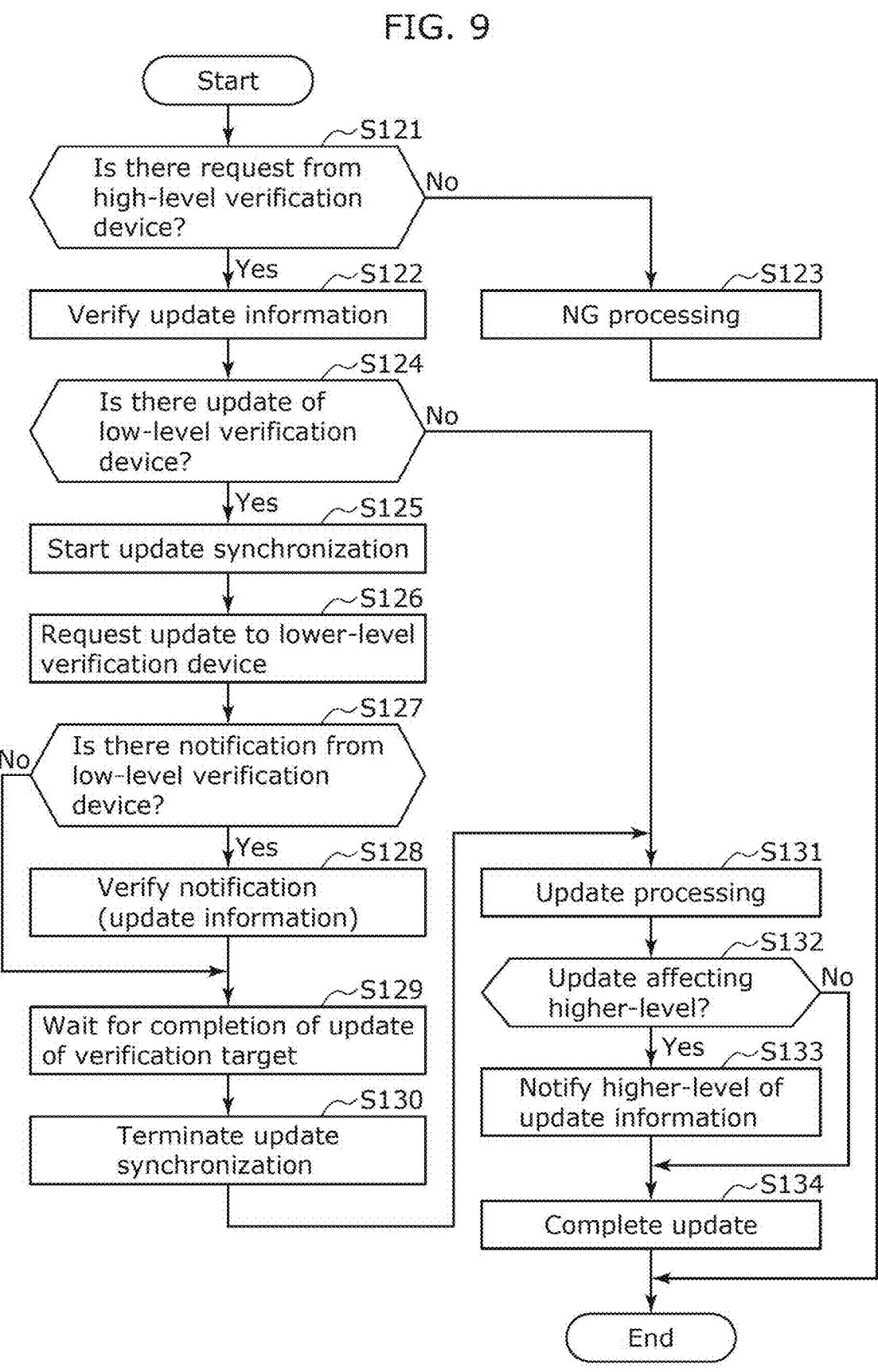
FIG. 9 is a flowchart illustrating an example of update processing by the verification system according to the embodiment.

FIG. 9 is a flowchart illustrating an example of update processing by the verification system according to the embodiment.

Verification device 702 determines whether an update request has been received from verification device 703, which is a high-level verification device (S121).

When the update request has been received from verification device 703 (Yes in S121), verification device 702 verifies received update information (S122).

When the update request has not been received from verification device 703 (No in S121), verification device 702 executes NG processing (S123) and terminates the update processing.

After step S122, based on the update information, verification device 702 determines whether there is an update of verification device 701, which is a low-level verification device (S124).

When determining that there is an update of verification device 701 (Yes in S124), verification device 702 starts update synchronization (S125).

Verification device 702 transmits the update request to verification device 701 (S126).

Verification device 702 determines whether there is a notification (the update request) from verification device 701 (S127).

When determining that there is a notification from verification device 701 (Yes in S127), verification device 702 verifies the notification (S128).

After step S128 or when determining that there is no notification from verification device 701 (No in S127), verification device 702 waits for the completion of the update of the verification target (verification device 701) (S129). For example, verification device 702 proceeds to next step S130 when receiving information completion indicating the completion of the update from verification device 701.

Verification device terminates the update 702 synchronization (S130).

After step S130 or when determining that there is no update of verification device 701 (No in S124), verification device 702 executes the update processing (S131). Step S131 is processing by updater 715.

Verification device 702 determines whether the update processing in step S131 is an update that affects verification device 703, which is a high-level verification device (S132). Specifically, verification device 702 determines whether the update processing in step S131 changes a storage area that stores a program implementing verification device 702 to be verified by verification device 703.

When determining that the update processing in step S131 is an update that affects verification device 703, which is a high-level verification device, (Yes in S132), verification device 702 notifies verification device 703 of the update information (i.e., the changed storage area) (S133).

When determining that the update processing in step S131 is not an update that affects verification device 703, which is a high-level verification device, (No in S132) or after step S133, verification device 702 completes the update processing (S134) and terminates the update processing.

Figure 10:
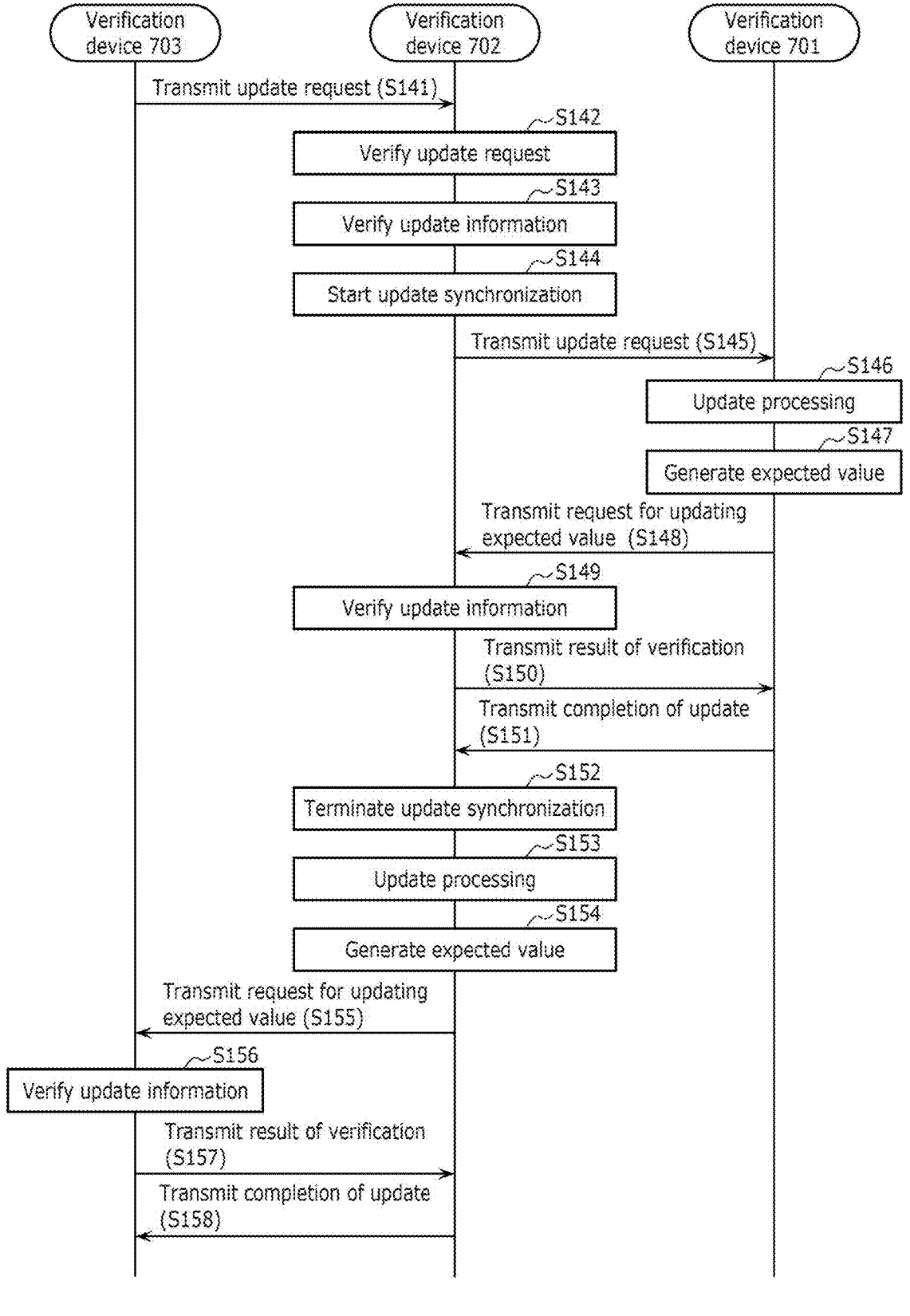
FIG. 10 is a sequence diagram illustrating an example of the update processing by the verification system according to the embodiment.

FIG. 10 is a sequence diagram illustrating an example of the update processing by the verification system according to the embodiment.

Verification device 703 transmits the update request to verification device 702 (S141).

When receiving the update request from verification device 703, verification device 702 verifies the update request (S142) and verifies the update information (S143). Step S143 corresponds to step S122.

Verification device 702 starts the update synchronization (S144). Step S144 corresponds to step S125.

Verification device 702 transmits the update request to verification device 701 (S145).

When receiving the update request from verification device 702, verification device 701 performs the update processing (S146) and generates an expected value of a program implementing verification device 701 (S147).

Verification device 701 transmits a request for updating the expected value to verification device 702 (S148).

Verification device 702 verifies the update information received from verification device 701 (S149) and transmits the result of the verification to verification device 701 (S150).

Verification device 701 then transmits, to verification device 702, update completion indicating that the update processing for the update request in step S145 has been completed (S151) and completes the update processing in verification device 701.

Verification device 702 terminates the update synchronization (S152) and performs the update processing (S153). Step S152 corresponds to step S130. Step S153 corresponds to step S131.

Verification device 702 generates an expected value of the program implementing verification device 702 (S154).

Verification device 702 transmits a request for updating the expected value to verification device 703 (S155). Step S155 corresponds to step S133.

Verification device 703 verifies the update information received from verification device 702 (S156) and transmits the result of the verification to verification device 702 (S157).

Verification device 702 then transmits, to verification device 703, update completion indicating that the update processing for the update request in step S141 has been completed (S158) and completes the update processing in verification device 702.

[Update of Verification Related Information]

FIG. 11 is a diagram illustrating an example of a configuration of the verification system in a case where a verification target is added. FIG. 12 is a diagram for describing update processing of verification related information in the case where the verification target is added.

FIG. 11 is a diagram illustrating an example of a case where verification device 701A is added as a verification target of verification device 702. When verification device 701A is thus added, as illustrated in FIG. 12, information on verification device 701A is added to the first verification related information as a verification target of verification device 702. Specifically, the ID of verification device 701A, the address of a storage area that stores a program implementing verification device 701A, and an expected value of the program implementing verification device 701A are added to the first verification related information.

FIG. 13 is a diagram illustrating an example of a configuration of the verification system in a case where a verification target is deleted. FIG. 14 is a diagram for describing update processing of verification related information in the case where the verification target is deleted.

FIG. 13 is a diagram illustrating an example of a case where verification device 701 is deleted as a verification target of verification device 702. When verification device 701 is thus deleted, as illustrated in FIG. 14, information on verification device 701 is deleted from the first verification related information as a verification target of verification device 702. Specifically, the ID of verification device 701, the address of the storage area that stores the program implementing verification device 701, and the expected value of the program implementing verification device 701 are deleted from the first verification related information. Note that, in this case, only the information indicating the verification target may be deleted.

Figure 15:
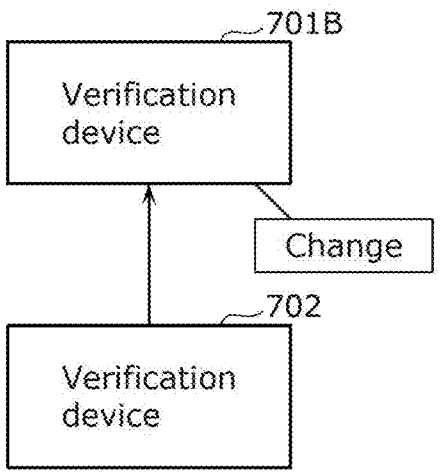
FIG. 15 is a diagram illustrating an example of a configuration of the verification system in a case where a verification target is changed.
Figure 16:
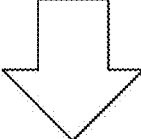
FIG. 16 is a diagram for describing update processing of verification related information in the case where the verification target is changed.

FIG. 15 is a diagram illustrating an example of a configuration of the verification system in a case where a verification target is changed. FIG. 16 is a diagram for describing update processing of verification related information in the case where the verification target is changed.

FIG. 15 is a diagram illustrating an example of a case where verification device 701 is changed to verification device 701B as a verification target of verification device 702. When verification device 701 is thus changed to verification device 701B, as illustrated in FIG. 16, information on verification device 701 in the first verification related information is rewritten with information on verification device 701B. Specifically, the ID of verification device 701, the address of the storage area that stores the program implementing verification device 701, and the expected value of the program implementing verification device 701 are changed to the ID of verification device 701B, the address of a storage area that stores a program implementing verification device 701B, and an expected value of the program implementing verification device 701B. Note that the address of the storage area that stores the program implementing verification device 701 will remain unchanged when there is no change between the address of the storage area and the address of the storage area that stores the program implementing verification device 701B. Alternatively, the change of the verification related information may be partial such as the verification target, the storage area, or the expected value. Specifically, in a case where a setting of verification device 701 is changed (a part of the program implementing verification device 701 is changed), only the expected value of the verification related information is changed.

[Advantageous Effects, Etc.]

The verification system according to the present embodiment includes verification device 702 (the first verification device) and verification device 703 (the second verification device). Verification device 702 verifies the integrity of verification device 701 (the first verification target). Verification device 703 has a higher security privilege than verification device 702 and verifies the integrity of verification device 702. Verification device 702 includes verifier 712 and updater 715. Verifier 712 refers to the first verification related information that includes the first verification target information indicating verification device 701 and the first expected value generated by performing the predetermined operation on the first data on the first program implementing verification device 701 and generates the first verification value by performing the predetermined operation on the data on the first storage area that stores the first program implementing the first verification target indicated by the first verification target information. Verifier 712 then verifies the integrity of verification device 701 by comparing the first verification value with the first expected value. When the first program is updated, updater 715 accepts the first update request for updating the first verification related information when receiving the first update request from verification device 703 or when receiving the first update request while the first verification related information is updated, and updater 715 updates the first verification related information based on the accepted first update request.

Accordingly, verification device 702 limits situations of accepting the first update request for updating the first verification related information in the case of updating the first program. It is thus possible to prevent the first verification related information from being updated freely. This is because the first update request transmitted from verification device 703, which has a higher security privilege than the first verification device or the first update request already accepted during the update of the first verification related information can be determined to be more likely to be normal.

The verification system according to the present embodiment further includes verification device 701. Verification device 701 verifies the integrity of the second verification target different from the first verification target and has a lower security privilege than verification device 702. Verification device 701 includes a verifier and an updater. The verifier of verification device 701 refers to the second verification related information that includes the second verification target information indicating the second verification target and the second expected value generated by performing the predetermined operation on second data on the second program implementing the second verification target and generates a second verification value by performing the predetermined operation on data on a second storage area that stores the second program implementing the second verification target indicated by the second verification target information. The verifier of verification device 701 verifies the integrity of the second verification target by comparing the second verification value with the second expected value. When the updater of verification device 701 receives the second update request for updating the second verification related information from verification device 702, the updater updates the second verification related information based on the received second update request. During the predetermined period in the update of the first verification related information, verification device 702 transmits the second update request to verification device 701.

When the second verification related information is updated, the first verification related information may lose its consistency under the influence of the update. For this reason, during the period in the update of the first verification related information, verification device 702 transmits the second update request to verification device 701 to cause verification device 701 to update the second verification related information. As a result, the second verification related information can be updated before the update of the first verification related information is completed, and the first verification related information can be updated with its consistency kept.

In the verification system according to the present embodiment, after the update of the second verification related information is completed, verification device 701 transmits the completion information indicating the completion of the update to verification device 702. When the second verification related information is updated, verification device 702 does not update the first verification related information but transmits the second update request to verification device 701 and, after receiving the completion information from verification device 701, updates the first verification related information.

Accordingly, verification device 702 updates the first verification related information after the update of the second verification related information by verification device 701 is completed, and thus the first verification related information can be updated with its consistency kept.

In the verification system according to the present embodiment, when the first storage area is changed as a result of the updating of the second verification related information, verification device 701 transmits the first area information indicating the changed first storage area to verification device 702. Based on the first area information, verification device 702 updates the first verification target information.

Accordingly, verification device 702 updates the first verification target information based on the first area information affected by the update of the second verification related information by verification device 701, and thus the first verification related information can be updated with its consistency kept.

In the verification system according to the present embodiment, when the third storage area that stores the third program implementing verification device 702 is changed as a result of the updating of the first verification related information, verification device 702 transmits the third area information indicating the changed third storage area to verification device 703.

Accordingly, verification device 703 can receive the third area information affected by the update of the first verification related information by verification device 702 and can thus specify the third storage area easily. As a result, verification device 703 can determine the integrity of verification device 702.

[Variations]

In the above-described embodiment, the pieces of verification related information are stored in storage 716 of verification device 702. However, this is not limitative. The pieces of verification target information and the expected values may be stored in the secure area. In this case, storage 716 may store only addresses for referring to the pieces of verification target information and the expected values stored in the secure area.

In the above-described embodiment, in the update synchronization, verification device 702 stops the verification of verification device 701 and waits for the completion of the update of verification device 701. However, this is not limitative. The update processing may be executed in an interval period between verifications of verification device 701 by verification device 702. Alternatively, verification device 702 may verify verification device 701 during the update processing. In this case, even when detecting an anomaly in verification device 701, verification device 702 may perform processing of not issuing an alert or may set a flag indicating that verification device 701 is being updated to a log containing the detection to allow the log to be distinguished as a log written during the update.

In the above-described embodiment, the update of the verification related information may be permitted in the following cases. For example, when an application is added or deleted, an OS to which the application is added may permit a corresponding verification device to perform the update. For example, when a virtual machine is added or deleted, a hypervisor to which the virtual machine is added may permit a corresponding verification device to perform the update.

In the above-described embodiment, verification device 702 updates verification related information on itself after accepting an update request. However, this is not limitative. Information for updating verification device 702 may be collected, and the verification related information may be updated. For example, an RI module may perform polling to check OS information, and when there is an update for an OS, the verification related information may be updated according to a preset policy (e.g., when an IDS is added, the IDS is linked (added as a monitoring target)).

As described above, the verification system according to the present disclosure has been described based on the above-described embodiment and its variations. The present disclosure is not limited to the embodiment and the variations. The above-described embodiment and the variations to which various modifications conceived by those skilled in the art are applied may be included within the present disclosure without departing from the gist of the present disclosure.

Note that, in the above-described embodiment, the constituent elements may be configured with dedicated hardware or may be implemented by executing a software program suitable for the constituent elements. The constituent elements may be implemented by a program executor such as a central processing unit (CPU) or a processor reading and executing a software program recorded in a recording medium such as a hard disk or a semiconductor memory. Here, pieces of software that implement the verification devices and the like in the above-described embodiments are computer programs that cause a computer to execute the steps in each of the flowcharts or the sequence diagram illustrated in FIG. 7 to FIG. 10.

The present disclosure may also include the following cases.

(1) At least one device described above may be implemented as a computer system that includes a microprocessor, a ROM, a RAM, a hard disk unit, a display unit, a keyboard, a mouse, and so forth. The RAM or the hard disk unit stores a computer program. The microprocessor's operating in accordance with the computer program enables its function. Here, the computer program is a collection of command codes that indicate instructions to the computer for achieving a predetermined function.

(2) One or more of the structural components included in at least one device described above may be implemented as a single system large scale integration (LSI). A system LSI is a super-multifunctional LSI fabricated by integrating a plurality of structural components on a single chip. The system LSI is more specifically a computer system that includes a microprocessor, a ROM, a RAM, and so forth. The RAM stores a computer program. The microprocessor's operating in accordance with the computer program enables the system LSI to achieve its function.

(3) One or more of the structural components included in at least one device described above may be implemented as an integrated circuit (IC) card or a single module removable from each device. The IC card or the module is a computer system that includes a microprocessor, a ROM, a RAM and so forth. The IC card or the module may include the super-multifunctional LSI described above. The microprocessor's operating in accordance with a computer program enables the IC card or the module to achieve its function. Such IC card or the module may be tamper resistant.

(4) The present disclosure may also be the above-described method. The present disclosure may also be a computer program that enables such method to be implemented by a computer, or digital signals that form the computer program.

Moreover, the present disclosure may be implemented as the computer program or digital signals recorded on a computer-readable recording medium such as a flexible disk, a hard disk, a Compact Disc (CD)-ROM, a DVD, a DVD-ROM, a DVD-RAM, a Blu-ray (registered trademark) disc (BD), and a semiconductor memory. The present disclosure may also be digital signals recorded in such recording medium.

Moreover, the present disclosure may transmit the computer program or the digital signals via, for example, a telecommunication line, a wireless or wired communication line, a network represented by the Internet, and data broadcasting.

Moreover, the present disclosure may also be achieved by transmitting the program or the digital signals recorded on the recording medium or by transmitting the program or the digital signals via, for example, the network, thereby enabling another independent computer system to carry out the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: PCT International Application No. PCT/JP2023/019047 filed on May 23, 2023, and Japanese Patent Application No. 2022-155590 filed on Sep. 28, 2022.

INDUSTRIAL APPLICABILITY

The verification system and the like according to the present disclosure are applicable to, for example, electronic equipment installed in a vehicle.

The invention claimed is:

1. A verification system comprising:
a first verification device that verifies integrity of a first verification target; and
a second verification device that has a higher security privilege than the first verification device and verifies integrity of the first verification device, wherein
the first verification device includes:
  a first memory; and
  a first processor coupled to the first memory, and
the first processor, by using the first memory, operates as:
  a first verifier that refers to first verification related information including first verification target information and a first expected value, the first verification target information indicating the first verification target, the first expected value being generated by performing a predetermined operation on first data on a first program implementing the first verification target, generates a first verification value by performing the predetermined operation on data on a first storage area storing the first program implementing the first verification target indicated by the first verification target information, and verifies the integrity of the first verification target by comparing the first verification value with the first expected value; and
a first updater that accepts, when the first program is updated, a first update request for updating the first verification related information when receiving the first update request from the second verification device or when receiving the first update request while the first verification related information is updated, and that updates the first verification related information based on the accepted first update request.

2. The verification system according to claim 1, further comprising
the first verification target, wherein
the first verification target is a third verification device, the third verification device verifying integrity of a second verification target different from the first verification target and having a lower security privilege than the first verification device,
the third verification device includes:
  a second memory; and
  a second processor coupled to the second memory, and
the second processor, by using the second memory, operates as:
  a second verifier that refers to second verification related information including second verification n target information and a second expected value, the second verification target information indicating the second verification target, the second expected value being generated by performing the predetermined operation on second data on a second program implementing the second verification target, generates a second verification value by performing the predetermined operation on data on a second storage area storing the second program implementing second verification target indicated by the second verification target information, and verifies the integrity of the second verification target by comparing the second verification value with the second expected value; and
a second updater that updates, when receiving a second update request for updating the second verification related information from the first verification device, the second verification related information based on the received second update request, and
during a predetermined period in updating of the first verification related information, the first verification device transmits the second update request to the third verification device.

3. The verification system according to claim 2, wherein
the third verification device transmits completion information to the first verification device after updating of the second verification related information is completed, the completion information indicating completion of the updating of the second verification related information, and
when the second verification related information is updated, the first verification device does not update the first verification related information but transmits the second update request to the third verification device and, after receiving the completion information from the third verification device, updates the first verification related information.

4. The verification system according to claim 3, wherein when the first storage area is changed as a result of the updating of the second verification related information, the third verification device transmits first area information indicating the changed first storage area to the first verification device, and the first verification device updates the first verification target information based on the first area information.

5. The verification system according to claim 1, wherein when a third storage area that stores a third program implementing the first verification device is changed as a result of the updating of the first verification related information, the first verification device transmits third area information indicating the changed third storage area to the second verification device.

6. The verification system according to claim 1, wherein the verification system includes a plurality of verification devices including the first verification device and the second verification device, each verification device of the plurality of verification devices verifies integrity of another verification device that has a lower security privilege than the verification device, out of the plurality of verification devices, a highest-level verification device having a highest security privilege is implemented in a secure area, and one or more low-level verification devices that are the plurality of verification devices other than the highest-level verification device is implemented in a normal area.

7. The verification system according to claim 1, wherein updating of the first program is any one of deleting the first program, modifying the first program, or adding another program, and after the updating of the first program is completed and after updating of the first verification related information is completed, the first verification device executes the updated first program.

8. A verification method by a verification system that includes a first verification device and a second verification device, the first verification device verifying integrity of a first verification target, the second verification device having a higher security privilege than the first verification device and verifying integrity of the first verification device, wherein the first verification device:

refers to first verification related information including first verification target information and a first expected value, the first verification target information indicating the first verification target, the first expected value being generated by performing a predetermined operation on first data on a first program implementing the first verification target, generates a first verification value by performing the predetermined operation on data on a first storage area storing the first program implementing the first verification target indicated by the first verification target information, and verifies the integrity of the first verification target by comparing the first verification value with the first expected value; and accepts, when the first program is updated, a first update request for updating the first verification related information when receiving the first update request from the second verification device or when receiving the first update request while the first verification related information is updated, and updates the first verification related information based on the accepted first update request.

9. A non-transitory computer-readable recording medium storing a program for causing a computer to execute the verification method according to claim 8.

* * * * *